United States Patent Office 3,346,327
Patented Oct. 10, 1967

3,346,327
MODIFICATION OF WOOL WITH ISATOIC ACID ANHYDRIDES IN THE PRESENCE OF BUTYRO-LACTONE
Nathan H. Koenig, Berkeley, Calif., assignor to the United States of America as represented by the Secretary of Agriculture
No Drawing. Filed Mar. 26, 1964, Ser. No. 355,128
5 Claims. (Cl. 8—128)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the chemical modification of wool by reacting it with an isatoic anhydride. Further objects of the invention will be apparent from the following description wherein parts and percentages are by weight unless otherwise specified.

In accordance with the present invention, wool is reacted with an isatoic anhydride in the presence of $\gamma$-butyrolactone. The latter compound catalyzes the actual chemical combination of the wool and the anhydride reactant. As a consequence one is enabled to readily prepare wools containing substantial proportions of combined isatoic anhydride with correspondingly improved properties.

The unusual and effective action of $\gamma$-butyrolactone as a catalyst for the reaction in question—rather than as a mere solvent—is demonstrated by the following experimental data:

Example 1

(A) Dry wool flannel (1.2 g.), 6-chloroisatoic anhydride (0.8 g.), and $\gamma$-butyrolactone (8 ml.) were heated for two hours at 105° C. The wool was then extracted with acetone and ethanol to remove unreacted materials, and dried. It was found that the increase in weight of the wool, due to reaction with the anhydride, was 26%.

(B) A series of experiments were then carried out under the same conditions but substituting for the $\gamma$-butyrolactone the same volume of the following solvents: butyl acetate, chlorobenzene, and xylene. In these runs, the increase in weight of the wool was only 3%.

In addition to the basic criterion that $\gamma$-butyrolactone has the ability to catalyze the reaction of wool with isatoic anhydrides, it has certain characteristics that make its use particularly advantageous for the reaction in question. Among these are a high boiling point (204° C.), a low vapor pressure, and a low order of toxicity. The high boiling point of the compound is advantageous in that reactions can be conducted at high temperatures without requiring pressure-tight vessels or other special apparatus. The low vapor pressure of $\gamma$-butyrolactone is advantageous in reducing fire hazard. Further, $\gamma$-butyrolactone is a stable compound and does not react to any material extent with wool. In sum, the characteristics of $\gamma$-butyrolactone indicate that it is a very useful catalyst for the modification of wool with isatoic anhydrides.

Carrying out the process of the invention essentially involves contacting wool with an isatoic anhydride in the presence of $\gamma$-butyrolactone. The reaction conditions such as proportions of reagents, specific isatoic anhydride used, time, temperature, etc., are not critical but may be varied to suit individual circumstances without changing the basic nature of the invention. The temperature of reaction may be about from 50° to 135° C. The reaction rate is increased with increasing temperature and a preferred temperature range to expedite the reaction without possibility of damage to the wool is 100–120° C. Generally, the $\gamma$-butyrolactone is used in a proportion of about from 5 to 10 parts per part of isatoic anhydride. It is preferred to carry out the reaction under anhydrous conditions thereby to ensure reaction between the wool and the isatoic anhydride, but the reaction can also be applied to wool in its normal undried condition (containing about 12–14% water). The degree of modification of the wool is related to the proportion of isatoic anhydride taken up by the fiber, that is, the higher the uptake of isatoic anhydride the greater will be the modification of the wool. In general, the uptake of isatoic anhydride may be varied about from 1 to 30% by weight. In conducting the reaction, the isatoic anhydride is generally employed in excess over the amount desired to be taken up by the fiber. The time of reaction will vary depending on the proportion of $\gamma$-butyrolactone, temperature of reaction, reactivity of the isatoic anhydride selected, and the degree of modification desired. In general, the reaction may take anywhere from several minutes to several hours.

After reaction of the wool with the isatoic anhydride, the chemically modified wool is preferably treated to remove excess isatoic anhydride, reaction by-products, $\gamma$-butyrolactone, and diluent, if such is used. Thus, the wool may be treated as by wringing, passage through squeeze-rolls, centrifugation, or the like to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to ensure complete removal of all unreacted materials. The treated wool is then dried in the usual way.

By treating wool with isatoic anhydrides as herein described, the wool is chemically modified because there is a chemical reaction between the isatoic anhydride and the protein molecules of the wool fibers. As a result, the modified wool exhibits advantageous properties over normal wool as explained below:

One noteworthy aspect of the invention is that the modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. Resistance to alkaline oxidizing conditions has been shown by exposure to solutions of sodium hypochlorite which is a commonly used commercial bleaching agent.

Another advantageous feature of the invention is the increased resistance of the modified wool to acids as indicated by its decreased solubility in hot hydrochloric acid. This factor improves the usefulness of the modified wool in applications where the product comes into contact with acidic materials. For example, wool may encounter acid conditions during manufacturing processes such as carbonizing to remove burrs; dyeing in acid dye baths; and fulling with acid media. The more resistant the wool is to such acid environments, the greater will be its subsequent mechanical strength and wear resistance.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate beyond question that actual chemical combination between the wool and the isatoic anhydride has taken place, it is not known for certain how the wool and isatoic anhydride moieties are joined. It is believed, however, that the isatoic anhydrides react with some of the sites on the wool molecule where there are reactive hydrogen atoms, e.g., amino, guanidino, hydroxyl, and thiol groups.

It may be, however, that other reactions occur and we do not intend to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be of all-wool composition or blends of wool with other textile fibers such as cotton, regenerated cellulose, viscose, animal hair, etc.

In a practice of the invention, one may employ isatoic anhydride itself or substituted isatoic anhydrides. The substituents may be, for example, alkyl groups such as methyl, ethyl, butyl, etc.; halogen radicals such as chloro, bromo, iodo, or fluoro; ether groups such as methoxy, ethoxy, butoxy, etc.; nitro groups; ester groups; etc. Typical examples of particular compounds which may be used are listed below and their structures shown by the formula:

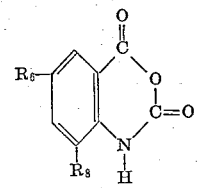

Isatoic anhydride ($R_6$ and $R_8$ are each hydrogen), 6-chloroisatoic anhydride ($R_6$ is chlorine, $R_8$ hydrogen), 6-nitroisatoic anhydride ($R_6$ is chlorine, $R_8$ hydrogen), 6-chloro-8-nitroisatoic anhydride ($R_6$ is chlorine, $R_8$ nitro), 6,8-dichloroisatoic anhydride ($R_6$ and $R_8$ are each chlorine).

The invention is demonstrated by Example I, above, and by the following examples:

Example II

A sample of the product of Example I, part A—made by reacting wool with 6-chloroisatoic anhydride in the presence of γ-butyrolactone—was tested to determine its resistance to hypochlorite. For comparison purposes, the same test was applied to the three products of Example I, part B, and to untreated wool.

The hypochlorite resistance test was performed as follows: A 2 cm. length of yarn was removed from the fabric and placed in a 50 ml. beaker containing 20 ml. of 3% aqueous sodium hypochlorite. The liquid was stirred by the rotation of a magnetically-activated bar until the yarn had dissolved, and the elapsed time was noted.

The results tabulated below show the increased resistance to sodium hypochlorite of wool modified in accordance with the invention.

| Modifying reagent | Medium used in modifying wool | Time to dissolve yarn in hypochlorite, min. |
|---|---|---|
| 6-chloroisatoic anhydride | γ-Butyrolactone | 75 |
| Do | Butyl acetate | 3 |
| Do | Chlorobenzene | 4 |
| Do | Xylene | 3 |
| None | None | 3 |

Example III

Two samples (*a* and *b*) of dried wool flannel (1.2 grams each) were each heated for two hours at 105° C. with a mixture of 6 ml. of γ-butyrolactone and the amount of isatoic anhydride indicated in the table below.

The treated wool samples were extracted as in Example I. The following results were obtained:

| Sample | Weight of isatoic anhydride, grams | Uptake of isatoic anhydride, percent |
|---|---|---|
| a | 0.5 | 14 |
| b | 1.0 | 23 |

A yarn from each product was then tested for resistance to sodium hypochlorite according to the procedure of Example II. The time to dissolve the yarn was 28 minutes for sample *a* and 85 minutes for sample *b*.

Example IV

Two samples (*a* and *b*) of dried wool flannel (1.2 grams each) were each heated with 1.0 grams of 6-chloroisatoic anhydride and 6 ml. of γ-butyrolactone at 105° C. for the times indicated below:

The treated wool samples were extracted as in Example I. The following results were obtained.

| Sample | Time of heating, hours | Uptake of 6-chloro-isatoic anhydride, percent |
|---|---|---|
| a | 1.0 | 19 |
| b | 2.0 | 27 |

Example V

The acid solubility of modified wools produced in accordance with the invention and that of untreated wool were determined in the following way: The wool sample is immersed in 5 N hydrochloric acid for one hour at 65° C. The loss in weight of the sample is then determined after thoroughly washing the acid-soaked wool. The increased resistance of modified wools to hot hydrochloric acid is illustrated by the following data:

| Product | Reactant | Uptake of reactant by wool, percent | Acid solubility, percent |
|---|---|---|---|
|  | None (untreated wool) | 0 | 12 |
| Ex. IIIb | Isatoic anhydride | 23 | 3 |
| Ex. IVb | 6-chloroisatoic anhydride | 27 | 3 |

Example VI

Tests were carried out to determine the improvement in shrinkage characteristics of the modified wools. The shrinkage tests were carried out as follows: The wool samples were milled at 1700 r.p.m. for 6 minutes at 40–42° C. in an "Accelerotor" with 0.9% sodium oleate solution, using a liquor to wool ratio of 50 to 1. After this washing operation, the samples were measured to determine their area. The improvement in shrinkage properties of wool modified in accordance with the invention is demonstrated by the following data:

| Product | Reactant | Uptake of reactant by wool, percent | Area shrinkage, percent |
|---|---|---|---|
|  | None (untreated wool) | 0 | 50 |
| Ex. IIIa | Isatoic anhydride | 14 | 7 |
| Ex. IVa | 6-chloroisatoic anhydride | 19 | 0 |

Having thus described the invention, what is claimed is:

1. A process for chemically modifying wool which comprises reacting wool under essentially anhydrous conditions, in the presence of γ-butyrolactone, with an isatoic anhydride.

2. A process for chemically modifying wool which comprises reacting wool under anhydrous conditions, in the presence of γ-butyrolactone, with isatoic anhydride.

3. A process for chemically modifying wool which comprises reacting wool under anhydrous conditions, in the presence of γ-butyrolactone, with 6-chloroisatoic anhydride.

4. A process for chemically modifying wool which comprises reacting wool under anhydrous conditions, in the presence of γ-butyrolactone, with 6-nitroisatoic anhydride.

5. A process for chemically modifying wool which comprises reacting wool under anhydrous conditions, in the presence of γ-butyrolactone, with 6,8-dichloroisatoic anhydride.

References Cited

UNITED STATES PATENTS

| 2,150,968 | 3/1939 | Guenther et al. | 8—116.2 X |
| 2,926,063 | 2/1960 | Reeves et al. | 8—116.2 |

FOREIGN PATENTS 458,684  12/1936  Great Britain.

NORMAN G. TORCHIN, *Primary Examiner.*

J. CANNON, *Assistant Examiner.*